United States Patent
Jayakumar et al.

(10) Patent No.: US 12,130,924 B2
(45) Date of Patent: Oct. 29, 2024

(54) SEAMLESS SMM GLOBAL DRIVER UPDATE BASE ON SMM ROOT OF TRUST

(71) Applicant: Intel Corporation, Santa Clara, CA (US)

(72) Inventors: Sarathy Jayakumar, Portland, OR (US); Jiewen Yao, Shanghai (CN); Murugasamy K Nachimuthu, Beaverton, OR (US); Ruixia Li, Shanghai (CN); Siyuan Fu, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 795 days.

(21) Appl. No.: 17/134,329

(22) Filed: Dec. 26, 2020

(65) Prior Publication Data

US 2021/0141903 A1 May 13, 2021

Related U.S. Application Data (60) Provisional application No. 63/116,079, filed on Nov. 19, 2020.

(51) Int. Cl.
G06F 21/57 (2013.01)
G06F 21/31 (2013.01)
G06F 21/79 (2013.01)

(52) U.S. Cl.
CPC .......... *G06F 21/572* (2013.01); *G06F 21/31* (2013.01); *G06F 21/575* (2013.01); *G06F 21/79* (2013.01)

(58) Field of Classification Search
CPC ........ G06F 21/572; G06F 21/31; G06F 21/79; G06F 21/575
See application file for complete search history.

(56) References Cited

U.S. PATENT DOCUMENTS

| | | | | |
|---|---|---|---|---|
| 7,747,848 | B1* | 6/2010 | Nallagatla | G06F 8/654 713/1 |
| 8,468,333 | B1* | 6/2013 | Nallagatla | G06F 8/654 713/1 |
| 2002/0169951 | A1* | 11/2002 | Zimmer | G06F 9/4812 713/100 |

(Continued)

OTHER PUBLICATIONS

Jinsoo Jang et al., SeCReT: Secure Channel between Rich Execution Environment and Trusted Execution Environment, NDSS (Year: 2015).*

(Continued)

*Primary Examiner* — Shanto Abedin
(74) *Attorney, Agent, or Firm* — Compass IP Law PC (57) ABSTRACT

Methods and apparatus for seamless SMM (System Management Mode) global driver update base on SMM Root-of-Trust. Mechanisms are provided to load and replace SMM drivers at runtime in a secure manner, without requiring an SMM firmware update and platform reset. SMM code is executed by BIOS during boot in a hidden area of memory called SMRAM space. Seamless update using an SMM Global Driver Update provides a method to load and replace all SMM drivers (including SMM infrastructure) on an already shipped platform production for purposes such as bug fixes. The principles and teachings may also be applied to update other types of secure execution mode code in addition to SMM code.

20 Claims, 4 Drawing Sheets

(56) References Cited

U.S. PATENT DOCUMENTS

| | | | |
|---|---|---|---|
| 2004/0103299 A1* | 5/2004 | Zimmer | G06F 9/4416 |
| | | | 713/193 |
| 2004/0255286 A1* | 12/2004 | Rothman | G06F 8/65 |
| | | | 717/168 |
| 2008/0270779 A1* | 10/2008 | Wilson | G06F 9/4401 |
| | | | 713/1 |
| 2009/0119748 A1* | 5/2009 | Yao | G06F 21/57 |
| | | | 726/2 |
| 2013/0031538 A1* | 1/2013 | Skalsky | G06F 9/4418 |
| | | | 717/168 |
| 2016/0070932 A1* | 3/2016 | Zimmer | H04L 9/302 |
| | | | 713/192 |
| 2017/0242598 A1 | 8/2017 | Nijhawan et al. | |
| 2019/0156015 A1* | 5/2019 | Brannock | G06F 9/468 |
| 2021/0019420 A1* | 1/2021 | Regupathy | G06F 9/4812 |

OTHER PUBLICATIONS

Extended European Search Report for Patent Application No. 21197922.4, Mailed Mar. 15, 2022, 9 pages.

\* cited by examiner

SEAMLESS SMM GLOBAL DRIVER UPDATE BASE ON SMM ROOT OF TRUST

BACKGROUND INFORMATION

System Management Mode (SMM) is an important runtime component of system firmware. It has higher privilege than the Operating System (OS) kernel/hypervisor, and is responsible for managing various platform configurations and events, such as register lock, Machine State Register (MSR) configuration, error handling, event handling (like Reliability, Availability and Serviceability (RAS), etc.

Today, update of an SMM driver requires a platform reset. This platform reset is very expensive for a fleet of hundreds of thousands of server nodes in a Data Center/Cloud environment. Such resets cause non-monetizable downtime and inability to maintain SLAs (Service Level Agreements) for Cloud Service Providers (CSPs).

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Embodiments of methods and apparatus for seamless SMM global driver update base on SMM Root-of-Trust are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

In accordance with aspects of embodiments disclosed herein, mechanisms are provided to load and replace SMM drivers at runtime in a secure manner, without requiring SMM firmware update and platform reset.

SMM code is executed by BIOS (Basic Input Output System) during boot in a hidden area of memory called SMRAM (System Management Random Access Memory) space. Certain register lock, MSR setting and feature enabling/disabling will require SMM privilege and is executable only when the processor is switched into SMM mode. Seamless Update of SMM Global Driver Update provides a method to load and replace all SMM drivers (include SMM infrastructure) on an already shipped platform production for purposes such as bug fixes.

To support SMM Driver Update, this disclosure proposes the following:
1. Introduce a Root-of-Trust component in SMM (SmmRoT) that is a standalone module and independent of any SMM services. SmmRoT will be the Initial Program Loader (IPL) of the SMM.
2. A mechanism to unload existing SMM drivers, load and execute new SMM drivers (including SMM infrastructure and other SMM components), then restore the runtime context with SmmRoT. The SmmRoT itself is protected and not updatable in this disclosure.
3. A mechanism to unlock system resources for a global driver update (Input-Output (IO), MSR(s), Register Context, etc.) with an SMM policy shim.

Definitions

A System Management Interrupt (SMI) is generated by platform events such as RAS, power management, thermal events or via software-triggered SMIs. An SMI is a high priority, non-maskable, broadcast interrupt. On receipt of an SMI the processors in the system save their context and transition to a mode called System Management Mode.

In SMM, the processor has saved the context it came out of The handler code then sets up its own environment (page tables, Interrupt Descriptor Tables (IDTs) etc.) and executes code that is placed by the platform BIOS/Firmware in an area of SMRAM (System Management RAM).

SMRAM is an area of memory that is hidden from the OS. Any writes to this area from outside of SMM will get dropped and reads from outside of SMM will results in −1's getting returned. This area of memory is only visible to processors that have switched to SMM.

SMM mode is predominantly used for handling runtime events that requires an intimate silicon and platform knowledge to handle, in an OS transparent fashion, such as RAS events, which are highly platform and silicon specific or can't trust ring-0 code to handle.

System Resource Defense de-privileges all the SMI handlers and SMM rendezvous to Ring3, defines a set of policy on which system resource (TO, MSR, Register Context, etc.) can be accessed by SMI handlers, and provides a ring0 SMM policy shim (SPS) to enforce the policy. The policy is set and locked by the BIOS POST code.

As discussed above, embodiments disclosed herein implement a mechanism to securely replace all SMM drivers and restore the runtime context, without platform reset using a small Root-of-Trust in SMM (SmmRoT). The SmmRoT is the Root-of-Trust for Update (RTU), and is a standalone module that is independent of any SMM services. It is responsible for unload existing SMM drivers, loading and executing new SMM drivers (including SMM infrastructure and other SMM components), and restoring the runtime context. The SmmRoT itself is protected and not updatable, in one embodiment.

The embodiments define a new architecture SMM boot mode called SMM_BOOT_MODE_RUNTIME_UPDATE for SMM driver running in the runtime update. The normal boot is SMM boot mode SMM_BOOT_MODE_INIT.

The SmmRoT maintains a preserved area in SRAM. This area is reserved by BIOS during boot and will be preserved during runtime update. The content of the preserved area includes the temporary (temp) stack, temp page table, temp GDT/IDT, temp exception handler, temp AP handler during the update. It also includes the context saved by other SMM drivers for restoration after the update.

Figure 1:
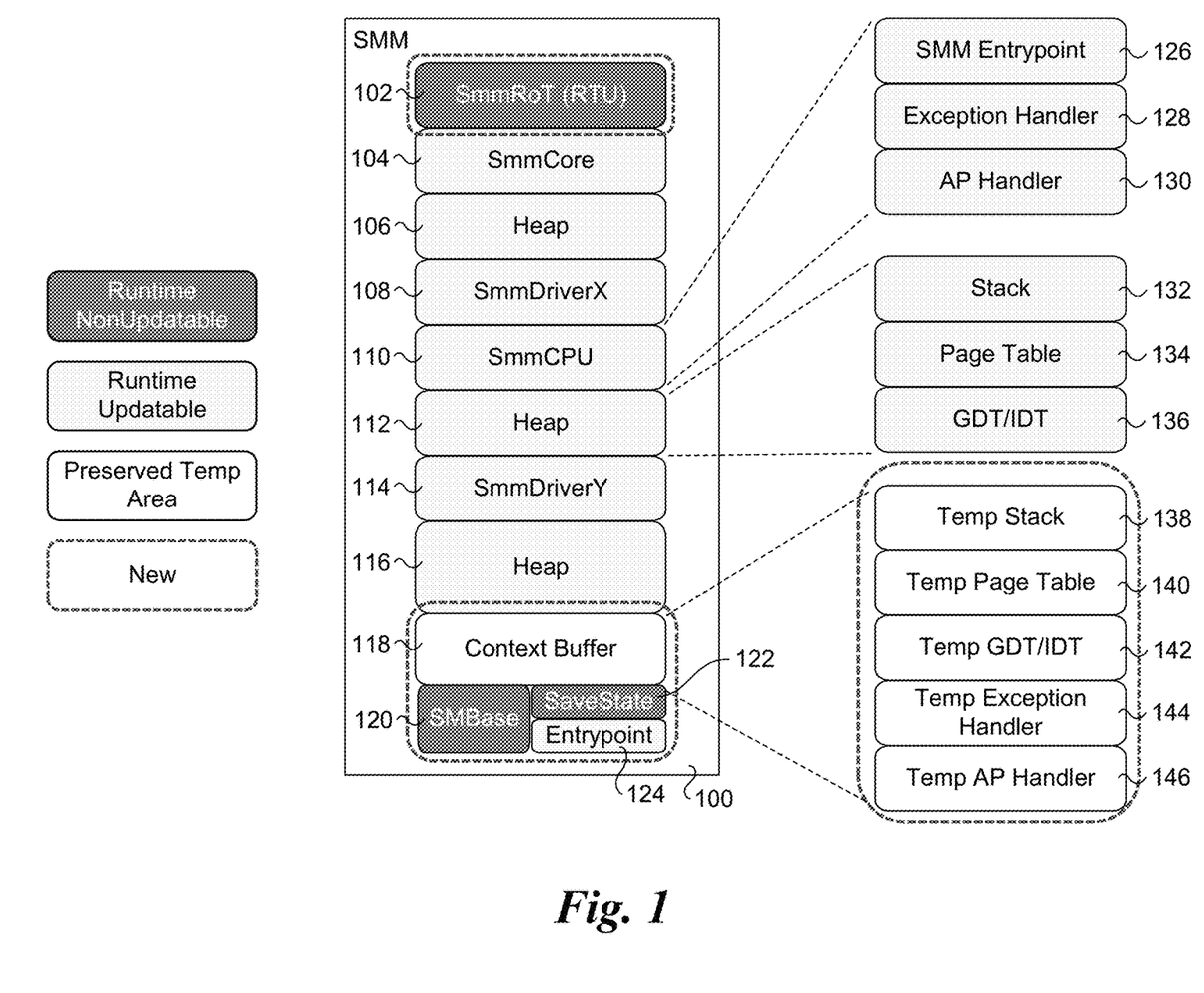
FIG. 1 is a schematic diagram showing an SMRAM memory layout, according to one embodiment.

One embodiment of an SMRAM memory layout is shown in FIG. 1. SMM 100 includes an SmmRot (RUT) 102, an SmmCore 104, a heap 106, an SmmDriverX 108, an SmmCPU 110, a heap 112, an SmmDriverY 114, a heap 116, a context buffer 118, an SMBase 120, a SaveState 122 and an entrypoint 124. SmmCPU includes an SMM Entrypoint 126, and exception hander 128, and an AP handler 130. Heap 112 includes a stack 132, a page table 134, and a Global Descriptor Table (GDT)/IDT 136.

The new components for context buffer 118 include a temp stack 138, a temp page table 140, a temp GDT/IDT 142, a temp exception handler 146, and a temp AP handler 146. SmmRoT 102, SMBase 120 and SaveState 122 are components that are not updatable during runtime. Context buffer 118 is located in the preserved temp area. The remaining components are runtime updatable.

In one embodiment, the boot flow of system BIOS is:
1. The SMM Initial Program Loader (SmmIpl) allocates SMRAM region and loads SmmRoT. The SmmIpl also allocates the reserved SMRAM region to be used as above preserved area by SmmRoT. Then SmmIpl passes the control to The SmmRoT.
2. SmmRoT set SMM boot mode to SMM_BOOT_MODE_INIT, then allocates SMRAM region and loads SmmCore.
3. SmmCore produces SMM dispatches all SMM drivers as normal.
4. SmmCore invokes a callback function of SmmRoT, where SmmRoT produces SMM service for runtime update context save/restore and registers an SMI handler for SMM global driver update.
5. For DGR enabled platform, the SmmRoT register itself with SMM Policy Shim to indicate that the SmmRoT region is write protected, and the Driver Update SMI handler need to be run at Ring0 (unlike other de-privileged SMI handlers at Ring3).
6. BIOS continues to complete the rest boot flow.
7. At runtime, the capsule is delivered to BIOS and processed (as described below).

Figure 2:
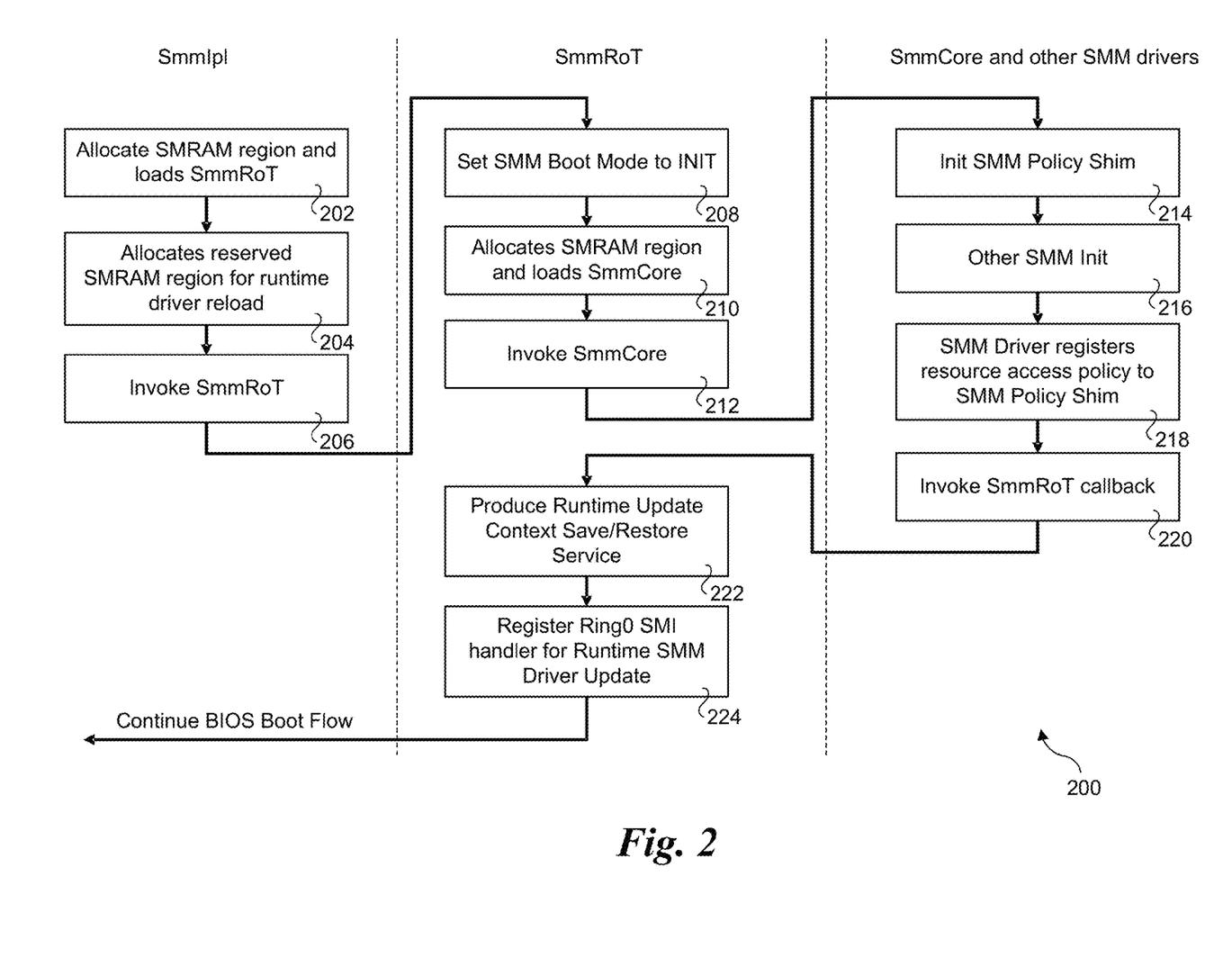
FIG. 2 is a flowchart illustrating operations performed during a boot flow, according to one embodiment.

One embodiment of the boot flow is illustrated in flowchart 200 of FIG. 2. In a block 202 the SMM Initial Program Loader (SmmIpl) allocates the SMRAM region and loads SmmRoT. In a block 204 the SmmIpl allocates a reserved SMRAM region for runtime driver reload to be used for the preserved area by SmmRoT. SmmIpl then passes the control to the SmmRoT in a block 206 by invoking SmmRoT.

Next, in a block 208 the SmmRoT sets SWIM boot mode to SMM_BOOT_MODE_INIT in a block 208, then allocates SMRAM region and loads SmmCore in a block 210. The SmmRot then invokes the SmmCore in a block 212 to pass control to the SmmCore and other SMM drivers.

In a block 214, the SmmCore initiates the SMM policy shim and performs other SMM initialization in a block 216. The SMM driver registers resource access policy to the SMM policy shim in a block 218. The SmmCore then invokes an SmmRoT callback in a block 220, passing control back to the SmmRoT.

In a block 222, the SmmRoT produces a runtime update context save/restore service and registers a Ring0 SMI handler for Runtime SMM Driver update in a block 224. BIOS then continues the boot flow process.

In one embodiment, the runtime SMM Global Driver Update includes:
1. An OS agent sends a new SMM Global Driver Update capsule image to SWIM through the BIOS-OS interface (ACPI method, Universal Extensible Firmware Interface (UEFI) runtime service, etc.).
2. The SMM Driver Update SMI handler verifies the capsule image. If the verification fails, the SMI handler will reject the capsule image, clean up the environment and return directly. In one embodiment, the SWIM Driver Update SMI handler runs at Ring0.
3. The SMM Driver Update SMI handler invokes other SMM driver's callback function to notify the runtime driver update. In one embodiment, SYS Exit to Ring0 before invoking each SMM driver's callback function.
4. Each SWIM driver's callback stops its service, saves the runtime context with the SMM runtime update context save/restore service.
5. After all other SWIM drivers are suspended, the SMM Driver Update SMI handler cleans up SMRAM, only leaves itself, save state and context buffer untouched. In order to run the code, the RTU must setup the temporary page table temporary GDT/IDT, temporary stack, temporary exception handler and temporary AP handler in the preserved content buffer. In one embodiment, the SMI handler cleans up the SMM Policy Shim to unlock all resource access.
6. The SMI handler set SMM Boot Mode to RUNTIME_UPDATE. Then loads the new SmmCore from the capsule image, let it re-initialize the environment and dispatch all SMM Drivers in in the capsule image. When the SMM driver is dispatched, it checks the SMM Boot Mode, and skip unnecessary initialization steps in RUNTIME_UPDATE mode. When SMM CPU driver is dispatched, it produces a service to exit SMM in RUNTIME_UPDATE boot mode.
7. After all new SMM drivers are dispatched, the SMI handler invokes other SMM driver's callback function to notify the context restore. In one embodiment, SYS Exit to Ring0 before invoking each SMM driver's callback function.
8. Each SMM driver's callback restore its context from the SMM runtime update context save/restore service. In one embodiment, each SMM driver register its new resource access policy to SMM Policy Shim.
9. After all new SMM drivers are restored, the SMM Global Driver Update is completed. The SMI Handler exits SMM with the exit SMM service produced by SMM CPU driver.

Figure 3:
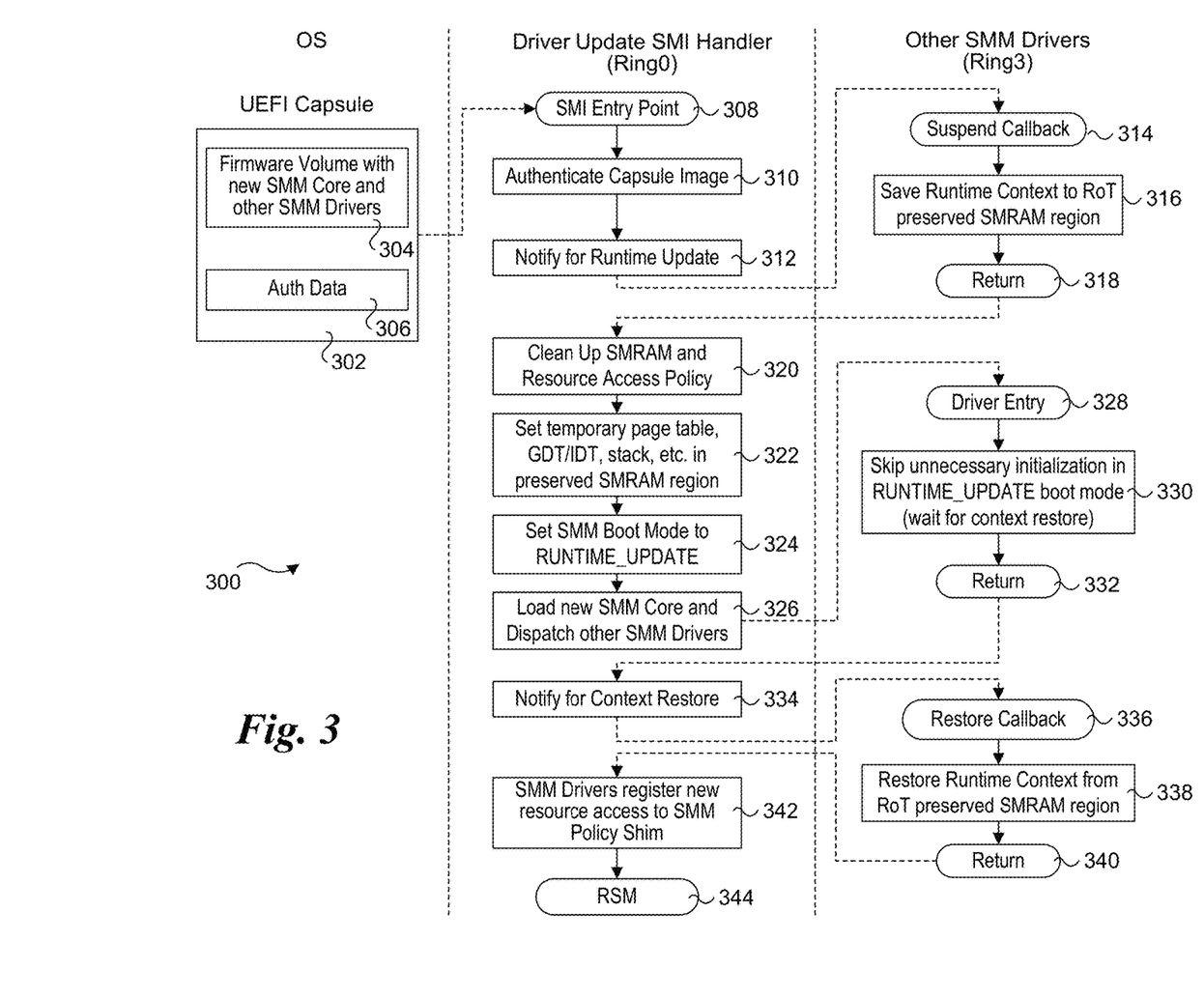
FIG. 3 is a flowchart illustrating operations performed during a runtime driver update process, according to one embodiment.

FIG. 3 shows a flowchart 300 illustrating the runtime driver update process, according to one embodiment. As shown at left, the process begins with and OS agent sending a UEFI capsule 302 including a firmware volume with new SMM core and other SMM drivers 304 and Auth data 306 through the BIOS-OS interface (not shown) to a driver update SMI handler running in Ring0 at SMI entry point 308. In a block 310 UEFI capsule 302 is authenticated (validated) as described above. In a block 312, the SMM Driver Update SMI handler invokes other SMM driver's callback function to notify the runtime driver update. In one embodiment, SYS Exit to Ring0 before invoking each SMM driver's callback function.

The processing next proceeds to other SMM drivers running in Ring3. In block 314 and 316 each SMM driver's callback stops its service, saves the runtime context with the SMM runtime update context save/restore service. The processing is returned to the driver update SMI hander in a return block 318.

After all other SMM drivers are suspended, in a block 320 the SWIM Driver Update SMI handler cleans up SMRAM, only leaves itself, save state and context buffer untouched. In one embodiment, to run the code, the RTU must setup the temporary page table temporary GDT/IDT, temporary stack, temporary exception handler and temporary AP handler in the preserved content buffer, as depicted in a block 322 In one embodiment, the SMI handler cleans up the SMM Policy Shim to unlock all resource access.

In a block 324, The SMI handler sets the SMM Boot Mode to RUNTIME_UPDATE. It then loads the new SmmCore from the capsule image, lets it re-initialize the environment and dispatch all SMM Drivers in in the capsule image in a block 326. When the SMM driver is dispatched, it checks the SMM Boot Mode, and skip unnecessary initialization steps in RUNTIME_UPDATE mode. When SMM CPU driver is dispatched, it produces a service to exit SMM in RUNTIME_UPDATE boot mode.

The process then returns to other SMM drivers at driver entry 328. After all new SMM drivers are dispatched, the SMI handler invokes other SMM driver's callback function to notify the context restore, as shown in a block 330. In one embodiment, SYS Exit to Ring0 before invoking each SMM driver's callback function, as depicted by a return block 332, a block 334, and a restore callback block 336.

In a block 338, each SMM driver's callback restores its context from the SMM runtime update context save/restore service. In one embodiment, following a return block 340, each SMM driver register its new resource access policy to SMM Policy Shim in a block 342. After all new SMM drivers are restored, the SMM Global Driver Update is completed. The SMI Handler exits SMM with the exit SMM service produced by SMM CPU driver, with operations resuming in RSM block 344.

Example Platform/Server

Figure 4:
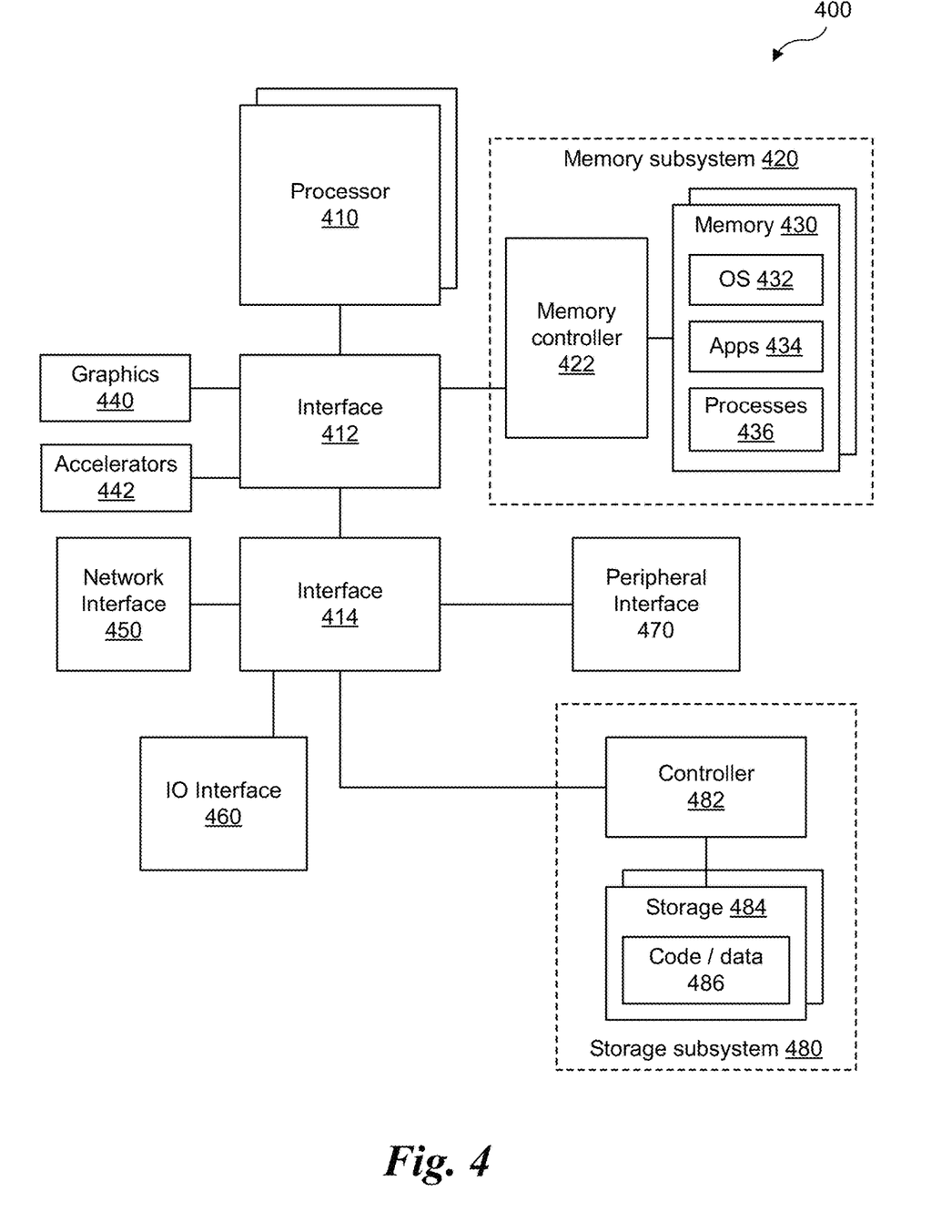
FIG. 4 is a diagram of a system that may be implemented with aspects of the embodiments described and illustrated herein.

FIG. 4 depicts a compute node 400 in which aspects of the embodiments disclosed above may be implemented. Compute node 400 includes one or more processors 410, which provides processing, operation management, and execution of instructions for compute node 400. Processor 410 can include any type of microprocessor, central processing unit (CPU), graphics processing unit (GPU), processing core, multi-core processor or other processing hardware to provide processing for compute node 400, or a combination of processors. Processor 410 controls the overall operation of compute node 400, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, compute node 400 includes interface 412 coupled to processor 410, which can represent a higher speed interface or a high throughput interface for system components that needs higher bandwidth connections, such as memory subsystem 420 or optional graphics interface components 440, or optional accelerators 442. Interface 412 represents an interface circuit, which can be a standalone component or integrated onto a processor die. Where present, graphics interface 440 interfaces to graphics components for providing a visual display to a user of compute node 400. In one example, graphics interface 440 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 440 generates a display based on data stored in memory 430 or based on operations executed by processor 410 or both. In one example, graphics interface 440 generates a display based on data stored in memory 430 or based on operations executed by processor 410 or both.

In some embodiments, accelerators 442 can be a fixed function offload engine that can be accessed or used by a processor 410. For example, an accelerator among accelerators 442 can provide data compression capability, cryptography services such as public key encryption (PKE), cipher, hash/authentication capabilities, decryption, or other capabilities or services. In some embodiments, in addition or alternatively, an accelerator among accelerators 442 provides field select controller capabilities as described herein. In some cases, accelerators 442 can be integrated into a CPU socket (e.g., a connector to a motherboard or circuit board that includes a CPU and provides an electrical interface with the CPU). For example, accelerators 442 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Accelerators 442 can provide multiple neural networks, CPUs, processor cores, general purpose graphics processing units, or graphics processing units can be made available for use by AI or ML models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 420 represents the main memory of compute node 400 and provides storage for code to be executed by processor 410, or data values to be used in executing a routine. Memory subsystem 420 can include one or more memory devices 430 such as read-only memory (ROM), flash memory, one or more varieties of random access memory (RAM) such as DRAM, or other memory devices, or a combination of such devices. Memory 430 stores and hosts, among other things, operating system (OS) 432 to provide a software platform for execution of instructions in compute node 400. Additionally, applications 434 can execute on the software platform of OS 432 from memory 430. Applications 434 represent programs that have their own operational logic to perform execution of one or more functions. Processes 436 represent agents or routines that provide auxiliary functions to OS 432 or one or more applications 434 or a combination. OS 432, applications 434, and processes 436 provide software logic to provide functions for compute node 400. In one example, memory subsystem 420 includes memory controller 422, which is a memory controller to generate and issue commands to memory 430. It will be understood that memory controller 422 could be a physical part of processor 410 or a physical part of interface 412. For example, memory controller 422 can be an integrated memory controller, integrated onto a circuit with processor 410.

While not specifically illustrated, it will be understood that compute node 400 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, compute node 400 includes interface 414, which can be coupled to interface 412. In one example, interface 414 represents an interface circuit, which can include standalone components and integrated circuitry. In one example, multiple user interface components or peripheral components, or both, couple to interface 414. Network interface 450 provides compute node 400 the ability to communicate with remote devices (e.g., servers or other computing devices) over one or more networks. Network interface 450 can include an Ethernet adapter, wireless interconnection components, cellular network interconnection components, USB (universal serial bus), or other wired or wireless standards-based or proprietary interfaces. Network interface 450 can transmit data to a device that is in the same data center or rack or a remote device, which can include sending data stored in memory. Network interface 450 can receive data from a remote device, which can include storing received data into memory. Various embodiments can be used in connection with network interface 450, processor 410, and memory subsystem 420.

In one example, compute node 400 includes one or more IO interface(s) 460. IO interface 460 can include one or more interface components through which a user interacts with compute node 400 (e.g., audio, alphanumeric, tactile/touch, or other interfacing). Peripheral interface 470 can include any hardware interface not specifically mentioned above. Peripherals refer generally to devices that connect dependently to compute node 400. A dependent connection is one where compute node 400 provides the software platform or hardware platform or both on which operation executes, and with which a user interacts.

In one example, compute node 400 includes storage subsystem 480 to store data in a nonvolatile manner. In one example, in certain system implementations, at least certain components of storage 480 can overlap with components of memory subsystem 420. Storage subsystem 480 includes storage device(s) 484, which can be or include any conventional medium for storing large amounts of data in a non-volatile manner, such as one or more magnetic, solid state, or optical based disks, or a combination. Storage 484 holds code or instructions and data 486 in a persistent state (i.e., the value is retained despite interruption of power to compute node 400). Storage 484 can be generically considered to be a "memory," although memory 430 is typically the executing or operating memory to provide instructions to processor 410. Whereas storage 484 is nonvolatile, memory 430 can include volatile memory (i.e., the value or state of the data is indeterminate if power is interrupted to compute node 400). In one example, storage subsystem 480 includes controller 482 to interface with storage 484. In one example controller 482 is a physical part of interface 414 or processor 410 or can include circuits or logic in both processor 410 and interface 414.

A volatile memory is memory whose state (and therefore the data stored in it) is indeterminate if power is interrupted to the device. Dynamic volatile memory requires refreshing the data stored in the device to maintain state. One example of dynamic volatile memory includes DRAM, or some variant such as Synchronous DRAM (SDRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014), HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications. The JEDEC standards are available at www.jedec.org.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall)

and SOT (Spin Orbit Transfer) based device, a thyristor based memory device, or a combination of any of the above, or other memory.

A power source (not depicted) provides power to the components of compute node 400. More specifically, power source typically interfaces to one or multiple power supplies in compute node 400 to provide power to the components of compute node 400. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, compute node 400 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), quick UDP Internet Connections (QUIC), RDMA over Converged Ethernet (RoCE), Peripheral Component Interconnect express (PCIe), Intel® QuickPath Interconnect (QPI), Intel® Ultra Path Interconnect (UPI), Intel® On-Chip System Fabric (IOSF), Omnipath, Compute Express Link (CXL), HyperTransport, high-speed fabric, NVLink, Advanced Microcontroller Bus Architecture (AMBA) interconnect, OpenCAPI, Gen-Z, Cache Coherent Interconnect for Accelerators (CCIX), 3GPP Long Term Evolution (LTE) (4G), 3GPP 5G, and variations thereof. Data can be copied or stored to virtualized storage nodes using a protocol such as NVMe over Fabrics (NVMe-oF) or NVMe.

In the foregoing embodiments implementations are described and illustrated as applied to an SMM and SMM driver update use case. However, this is merely exemplary and non-limiting. More generally, the principles and teachings disclosed herein may be used to perform runtime updates of secure execution mode firmware components, including secure execution mode infrastructure components. As used herein, including the claims, secure execution mode is an execution mode of the processor during which execution of an operating system is paused and provides access to firmware code and hardware that is otherwise not accessible outside of the secure execution mode.

In addition to applying secure execution mode firmware for computing platforms with CPUs, the teaching and principles disclosed herein may be applied to Other Processing Units (collectively termed XPUs) including one or more of Graphic Processor Units (GPUs) or General Purpose GPUs (GP-GPUs), Tensor Processing Unit (TPU) Data Processor Units (DPUs), Artificial Intelligence (AI) processors or AI inference units and/or other accelerators, FPGAs and/or other programmable logic (used for compute purposes), etc. While some of the diagrams herein show the use of CPUs, this is merely exemplary and non-limiting. Generally, any type of XPU may be used in place of a CPU in the illustrated embodiments. Moreover, as used in the following claims, the term "processor" is used to generically cover CPUs and various forms of XPUs.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. Additionally, "communicatively coupled" means that two or more elements that may or may not be in direct contact with each other, are enabled to communicate with each other. For example, if component A is connected to component B, which in turn is connected to component C, component A may be communicatively coupled to component C using component B as an intermediary component.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a non-transitory computer-readable or machine-readable storage medium. A non-transitory computer-readable or machine-readable storage medium includes any mechanism for storing or transmitting information in a form readable by a machine (e.g., a computer). For example, a non-transitory computer-readable or machine-readable storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A non-transitory computer-readable or machine-readable storage medium may also include a storage or database from which content can be downloaded. The non-transitory computer-readable or machine-readable storage medium may also include a device or product having content stored thereon at a time of sale or delivery. Thus, delivering a device with stored content, or offering content for download over a communication medium may be understood as providing an article of manufacture comprising a non-transitory computer-readable or machine-readable storage medium with such content described herein.

Various components referred to above as processes, servers, or tools described herein may be a means for performing the functions described. The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including non-transitory computer-readable or machine-readable storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method for updating secure execution mode code in system firmware of a computing platform including a processor, comprising:
    during an execution mode of the processor comprising an operating system runtime mode under which an operating system is executed on the processor,
        receiving an update package including one or more updated secure execution mode components;
    switching the execution mode of the processor to a secure execution mode;
    while in the secure execution mode;
        storing a system runtime context;
        unloading one or more existing secure execution mode components;
        loading and executing the one or more updated secure execution mode components;
        restoring the system runtime context;
    exiting the secure execution mode; and
    returning the execution mode to the operating system runtime mode, wherein the updated secure execution mode components include secure execution mode infrastructure code.

2. The method of claim 1, further comprising:
    executing a Root-of-Trust firmware component to preserve a memory region in system management random access memory (SMRAM); and
    store the system runtime context in the preserved region SMRAM region.

3. The method of claim 2, wherein the Root-of-Trust firmware component is a standalone module that is not updatable.

4. The method of claim 2, further comprising employing the preserved SMRAM region to store, during the update, two or more of a temporary stack, a temporary page table, a temporary Global Descriptor Table (GDT), an temporary Interrupt Descriptor Table (IDT), a temporary exception handler, and a temporary Application Processor (AP) handler.

5. The method of claim 2, wherein the computing platform includes system memory, further comprising:
    during boot operations for the computing platform,
        allocating an SMRAM region in the system memory;
        executing the Root-of-trust firmware component and secure execution mode infrastructure firmware components to configure the computing platform to support operating system runtime update of secure execution mode firmware code.

6. The method of claim 3, wherein configuring the computing platform to support operating system runtime update of secure execution mode firmware code comprises:
    producing a runtime update context save and restore service; and
    registering an interrupt handler for runtime secure execution mode code update that is to be invoked to effect, at least in part, secure execution mode code update during runtime operations for the computing platform.

7. The method of claim 1, wherein the updated secure execution mode components include secure execution mode drivers, further comprising unlocking system resources for a global secure execution mode driver update under which a plurality of secure execution mode drivers are updated.

8. The method of claim 1, wherein the secure execution mode comprises a System Management Mode (SMM), and wherein the updated secure execution mode components include a plurality of updated SMM drivers.

9. The method of claim 8, wherein the processor supports execution in a plurality of rings having different privileges, further comprising:
    executing a driver update System Management Interrupt (SMI) handler in a first ring; and
    executing one or more SMM drivers in a second ring having a lower privilege level than the first ring,
    wherein the driver update SMI handler is used to unload one or more existing SMM drivers and load and update one or more updated SMM drivers.

10. The method of claim 8, wherein the updated secure execution mode components include an SMM Core component.

11. A computing platform, comprising:
a processor;
system memory, operatively coupled to the processor;
a network interface, operatively coupled to the processor;
a firmware storage device in which firmware instructions are stored; and
an operating system,
wherein, firmware instructions are configured to be executed on the processor to enable the computing platform to:
during an execution mode of the processor comprising an operating system runtime mode under which an operating system is executed on the processor and after an update package including one or more updated secure execution mode components has been received,
switch the execution mode of the processor to a secure execution mode under which a portion of firmware instructions are executed;
while in the secure execution mode;
store a system runtime context;
unload one or more existing secure execution mode components;
load and execute the one or more updated secure execution mode components;
restore the system runtime context;
exit the secure execution mode; and
return the execution mode to the operating system runtime mode,
wherein the updated secure execution mode components include secure execution mode infrastructure components.

12. The computing platform of claim 11, wherein the firmware instructions include a Root-of-Trust firmware component, wherein execution of the firmware instructions further enables the platform to:
allocate a portion of the system memory as system management random access memory (SMRAM);
preserve, via execution the Root-of-Trust firmware component, a memory region in SMRAM; and
store the system runtime context in the preserved region SMRAM region.

13. The computing platform of claim 12, wherein execution of the firmware instructions further enables the platform to:
during boot operations for the computing platform,
allocate an SMRAM region in the system memory;
execute the Root-of-trust firmware component and secure execution mode infrastructure firmware components to configure the computing platform to support operating system runtime update of secure execution mode firmware code.

14. The computing platform of claim 12, wherein the updated secure execution mode components include secure execution mode drivers, and wherein execution of the firmware instructions further enables the platform to unlock system resources for a global secure execution mode driver update under which a plurality of secure execution mode drivers are updated.

15. The computing platform of claim 11, wherein the secure execution mode comprises a System Management Mode (SMM), and wherein the updated secure execution mode components include a plurality of updated SMM drivers.

16. A non-transitory machine-readable medium having firmware instructions stored thereon configured to be executed on processor in a computing platform having system memory and an operating system, wherein execution of the firmware instructions enable to computing platform to:
during an execution mode of the processor comprising an operating system runtime mode under which an operating system is executed on the processor and after an update package including one or more updated secure execution mode components has been received,
switch the execution mode of the processor to a secure execution mode under which a portion of firmware instructions are executed;
while in the secure execution mode;
store a system runtime context;
unload one or more existing secure execution mode components;
load and execute the one or more updated secure execution mode components;
restore the system runtime context;
exit the secure execution mode; and
return the execution mode to the operating system runtime mode,
wherein the updated secure execution mode components include secure execution mode infrastructure components.

17. The non-transitory machine-readable medium of claim 16, wherein the firmware instructions include a Root-of-Trust firmware component, and wherein execution of the firmware instructions further enables the platform to:
allocate a portion of the system memory as system management random access memory (SMRAM);
preserve, via execution the Root-of-Trust firmware component, a memory region in SMRAM; and
store the system runtime context in the preserved region SMRAM region.

18. The non-transitory machine-readable medium of claim 17, wherein execution of the firmware instructions further enables the platform to:
during boot operations for the computing platform,
allocate an SMRAM region in the system memory;
execute the Root-of-trust firmware component and secure execution mode infrastructure firmware components to configure the computing platform to support operating system runtime update of secure execution mode firmware code.

19. The non-transitory machine-readable medium of claim 16, wherein the updated secure execution mode components include secure execution mode drivers, and wherein execution of the firmware instructions further enables the platform to unlock system resources for a global secure execution mode driver update under which a plurality of secure execution mode drivers are updated.

20. The non-transitory machine-readable medium of claim 16, wherein the secure execution mode comprises a System Management Mode (SMM), and wherein the updated secure execution mode components include a plurality of updated SMM drivers.

* * * * *